(12) United States Patent
Palfreman et al.

(10) Patent No.: US 7,918,327 B2
(45) Date of Patent: Apr. 5, 2011

(54) APPARATUS FOR LATERALLY TRANSFERRING BARS FROM A RECEIVING PATH TO A BRAKING PATH

(75) Inventors: Matthew Palfreman, Charlton, MA (US); Terence Michael Shore, Princeton, MA (US)

(73) Assignee: Siemens Industry, Inc., Alpharetta, GA (US)

( * ) Notice: Subject to any disclaimer, the term of this patent is extended or adjusted under 35 U.S.C. 154(b) by 80 days.

(21) Appl. No.: 12/506,694

(22) Filed: Jul. 21, 2009

(65) Prior Publication Data

US 2011/0017577 A1    Jan. 27, 2011

(51) Int. Cl.
*B65G 47/26* (2006.01)
*B21B 39/20* (2006.01)

(52) U.S. Cl. ............... 198/457.02; 198/456; 414/745.1; 414/746.7; 72/201; 266/277

(58) Field of Classification Search ............... 198/456, 198/457.02, 458; 414/745.1, 746.7; 266/277; 72/201
See application file for complete search history.

(56) References Cited

U.S. PATENT DOCUMENTS

| | | | |
|---|---|---|---|
| 2,809,545 A | 10/1957 | Norlindh | |
| 3,236,084 A | 2/1966 | Kato | |
| 3,602,028 A * | 8/1971 | Klusmier et al. | 72/201 |
| 3,610,437 A | 10/1971 | Barakov et al. | |
| 3,621,696 A | 11/1971 | Norlindh | |
| 3,881,336 A * | 5/1975 | Cofer et al. | 72/45 |
| 4,044,585 A * | 8/1977 | Buchheit | 72/201 |
| 4,054,047 A | 10/1977 | Sclippa | |
| 4,176,535 A | 12/1979 | Elsner et al. | |
| 4,250,729 A | 2/1981 | Berz | |
| 4,307,594 A | 12/1981 | Steinbock | |
| 4,448,298 A | 5/1984 | Matsuo | |
| 4,905,816 A | 3/1990 | Matsuo et al. | |
| 4,977,806 A | 12/1990 | Poloni | |

(Continued)

FOREIGN PATENT DOCUMENTS

DE    3725886    9/1988

*Primary Examiner* — Mark A Deuble
(74) *Attorney, Agent, or Firm* — Seyed Kaveh E. Rashidi-Yazd (57) ABSTRACT

An apparatus is disclosed for receiving successive bars moving longitudinally along an entry path and for laterally transferring the bars from the entry path to a braking path. The apparatus comprises a run in table having a plurality of rollers arranged to convey the bars along the entry path. A braking surface is arranged between the run in table and the braking path. The braking surface and the rollers of the run in table lie in a reference plane sloping downwardly from the entry path to the braking path. A dividing wall is arranged between the run in table and the braking surface. The dividing wall is adjustable between a raised position projecting above the reference plane to block lateral downward movement of bars from the entry path across the braking surface to the braking path, and a lowered position accommodating such downward movement. A switch is positioned in advance of the dividing wall. The switch has a plurality of guide channels arranged around a common axis. The switch is positioned to successively align individual guide channels with the entry path to thereby direct bars passing therethrough along the entry path while the dividing wall is in its raised position, and is rotatable about its axis to successively realign the individual guide channels with the braking path to thereby direct bars passing therethrough to and along the braking path when the dividing wall is in its lowered position.

7 Claims, 10 Drawing Sheets

U.S. PATENT DOCUMENTS

| | | |
|---|---|---|
| 5,301,794 A | 4/1994 | Tomasetig |
| 5,413,207 A * | 5/1995 | Pong ........................ 198/457.02 |
| 6,192,729 B1 | 2/2001 | Offoiach |
| 6,855,290 B2 | 2/2005 | Castellani |
| 7,219,521 B1 | 5/2007 | Eldredge |
| 2008/0196236 A1 * | 8/2008 | Giuseppe et al. ............ 29/527.6 |

* cited by examiner

APPARATUS FOR LATERALLY TRANSFERRING BARS FROM A RECEIVING PATH TO A BRAKING PATH

BACKGROUND

1. Field of the Invention

This invention related generally to rolling mills producing hot rolled steel bars and the like, and is concerned in particular with an improved apparatus for receiving the bars moving longitudinally along an entry path, and for laterally transferring the bars from the entry path to a braking path where they are allowed to slide to a stop before being transferred to a cooling bed or the like.

2. Description of the Prior Art

In a known prior art bar handling system, as depicted in FIGS. 11A to 11D, an exit roller table comprises a series of driven table rollers 10 arranged along an entry path $P_e$. The entry path Pe is separated from a braking path $P_b$ by a dividing wall 12.

Figure 11A:
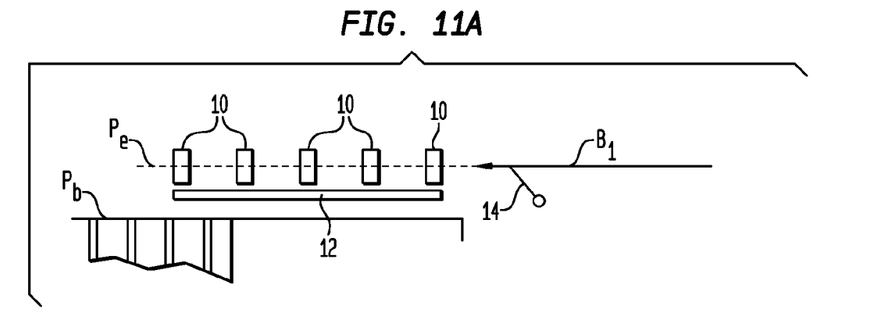
FIGS. 11A-11D are diagrammatic illustrations of a prior art bar handling system.

At the stage depicted in FIG. 11A, the front end of a bar $B_1$ is approaching the exit roller table and is being guided along the entry path $P_e$ by a pivotable paddle switch 14.

Figure 11B:
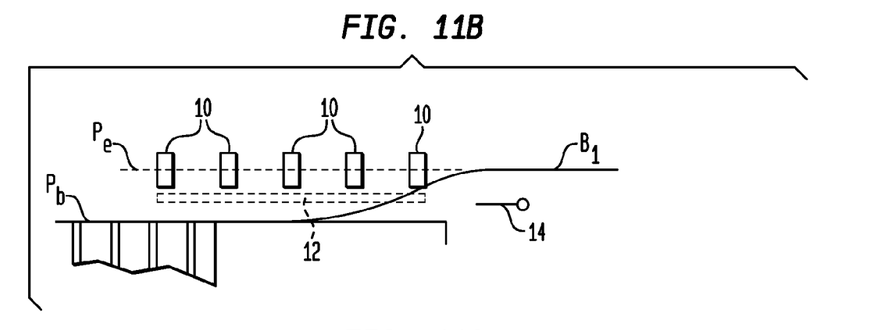

In FIG. 11B, the dividing wall 12 has been lowered, allowing the bar to slide laterally into the braking path $P_b$, and the switch 14 has been pivoted to an inoperative position clear of the entry path $P_e$.

Figure 11C:
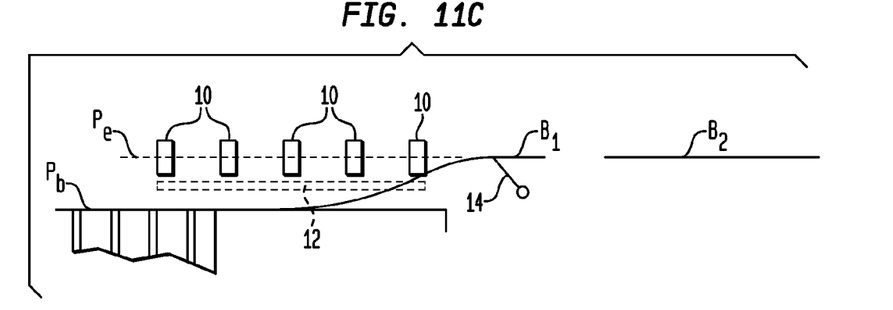

In FIG. 11C, the tail end of the bar $B_1$ is approaching the exit roller table, and is followed closely by the front end of the next oncoming bar $B_2$. The switch has been 14 returned to its operative position in anticipation of the arrival of bar $B_2$.

Figure 11D:
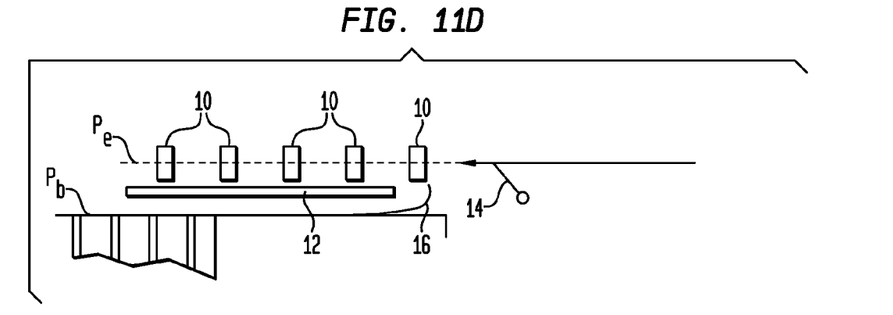

As shown in FIG. 11D, the operatively positioned switch 14 produces a kink 16 in the tail end of bar $B_1$. Such kinks can snag on the dividing wall 12 and other downstream structures, causing interruptions in the processing of subsequent bars. At higher rolling speeds, this problem is exacerbated by increased bar momentum.

The present invention has as its primary objective the elimination of the prior art paddle switch 14 in favor of an improved rotary switch arrangement which anticipates the arrival of each bar front end without deforming the tail ends of preceding bars.

Preferred embodiments of the present invention will now be described in greater detail with reference to the accompanying drawings wherein:

BRIEF DESCRIPTION OF THE DRAWINGS

FIGS. 1A-5A and 1B-5B are sectional views on an enlarged scale taken on lines A-A and B-B respectively of FIGS. 1-5;

DETAILED DESCRIPTION

Figure 1:
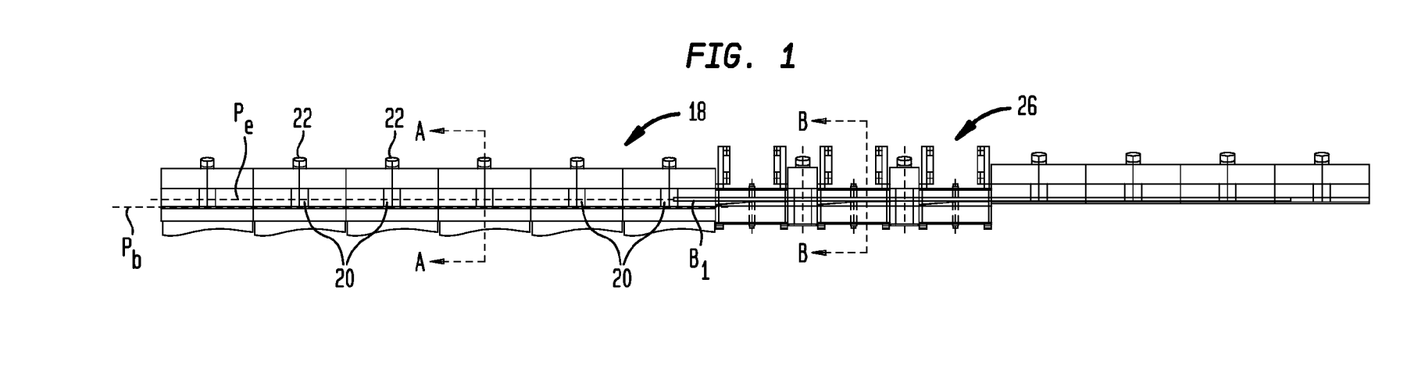
FIGS. 1-5 are plan views showing an apparatus in accordance with the present invention at successive stages during its cycle of operation.
Figure 1A:
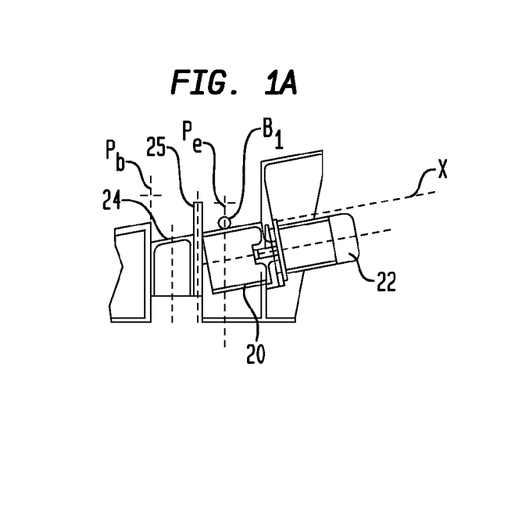
Figure 1B:
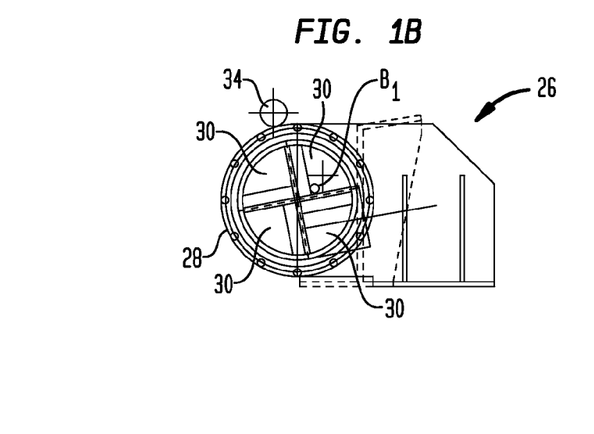

With reference initially to FIGS. 1, 1A, and 1B, an apparatus in accordance with the present invention comprises a roller exit table 18 having a plurality of rollers indicated typically at 20 arranged to convey bars along an entry path $P_e$. The rollers 20 are individually driven by motors 22. A braking surface 24 is arranged between the exit table 18 and a braking path $P_b$. The rollers 20 and the braking surface 24 lie in a plane X sloping downwardly from the entry path $P_e$ to the braking path $P_b$.

A dividing wall 25 is arranged between the rollers 20 of the exit table 18 and the braking surface 24. The dividing wall is adjustable between a raised position projecting upwardly above plane X, and a lowered position beneath plane X (compare FIGS. 1A and 3A).

A rotary switch mechanism 26 is positioned in advance of the roller exit table 18. As can best be seen in FIGS. 6-8, the switch mechanism includes one or more axially aligned barrels 28, each being internally subdivided into a plurality of guide channels 30 arranged around a common axis A. The guide channels 30 are generally notch-shaped and defined by bottom walls 30a and side walls 30b.

Figure 6:
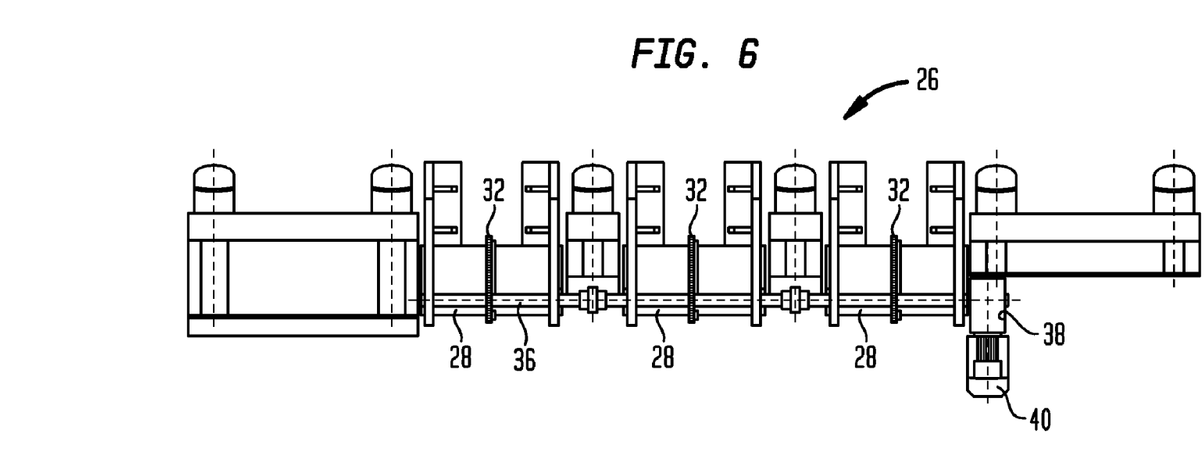
FIG. 6 is an enlarged plan view of the rotary switch mechanism.
Figure 7:
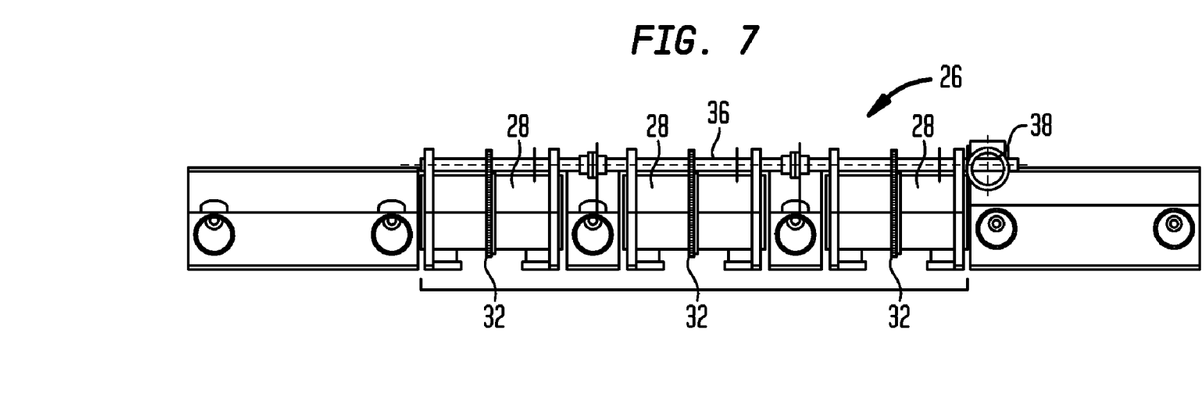
FIG. 7 is a side view of the rotary switch mechanism.
Figure 8:
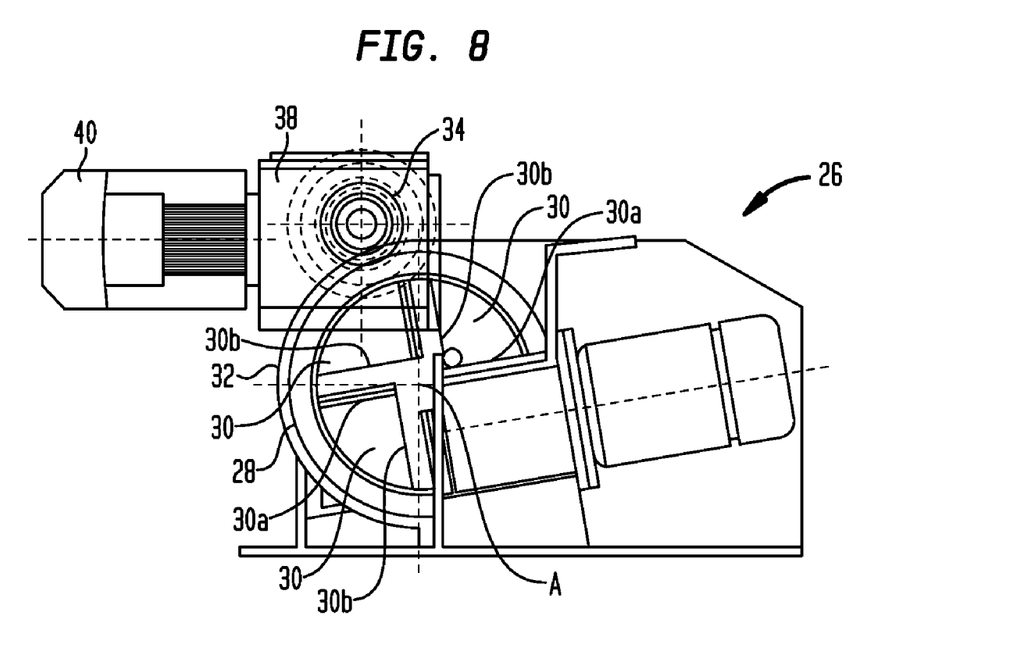
FIG. 8 is an end view of the rotary switch mechanism.

The barrels 28 are provided with external ring gears 32 in meshed relationship with pinions 34 carried on a shaft 36 driven via a gear reducer 38 by motor 40. With this arrangement, the barrels 28 are rotated in unison about axis A by energizing motor 40. The barrels are arranged to rotatably align successive guide channels 30 initially with the entry path $P_e$ and subsequently with the braking path $P_b$.

At the stage illustrated in FIGS. 1A, 1A and 1B, a first bar $B_1$ has passed along entry path $P_e$ through aligned guide channels 30 of the switch barrels and is entering the roller exit table 18. The dividing wall 12 is in its raised position projecting above plane X.

Figure 2:
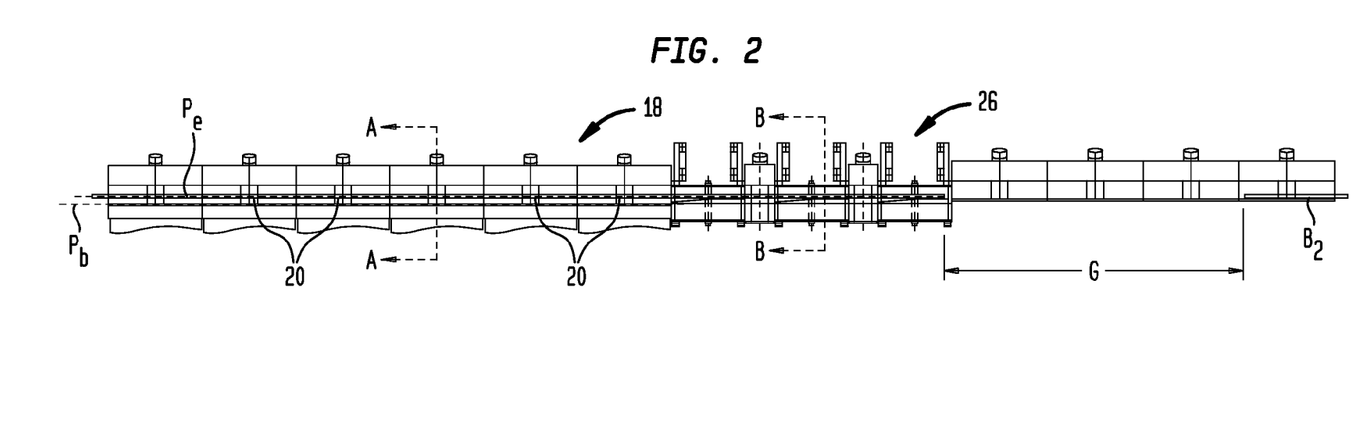
Figure 2A:
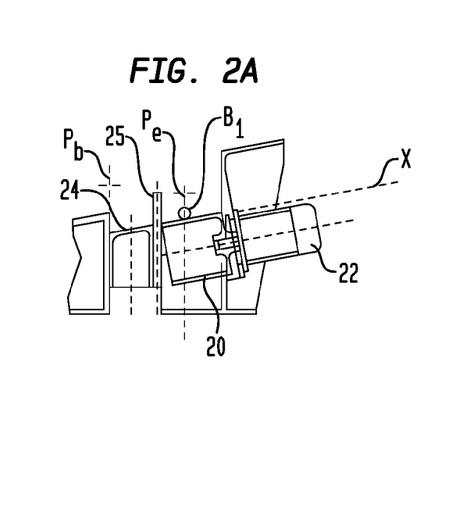
Figure 2B:
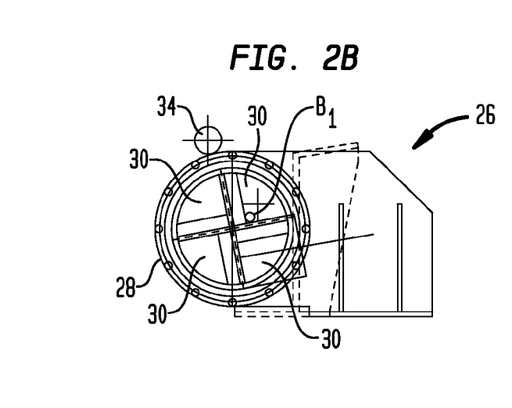

At the stage depicted in FIGS. 2, 2A, and 2B, the bar $B_1$ has been divided from a succeeding bar length $B_2$ by an upstream shear (not shown), and rotation of the table rollers 20 has been accelerated to produce or "pull" a gap G between the tail end of bar $B_1$ and the front end of bar $B_2$.

Figure 3:
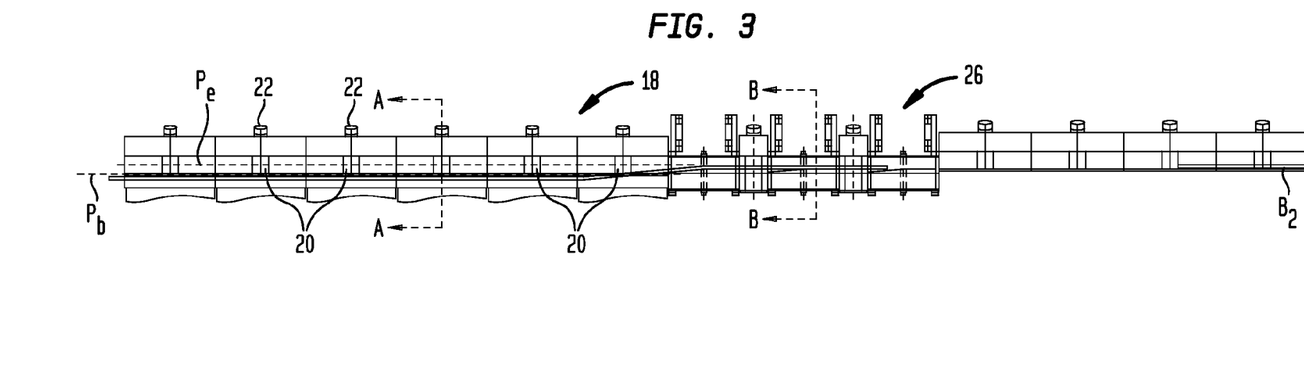
Figure 3A:
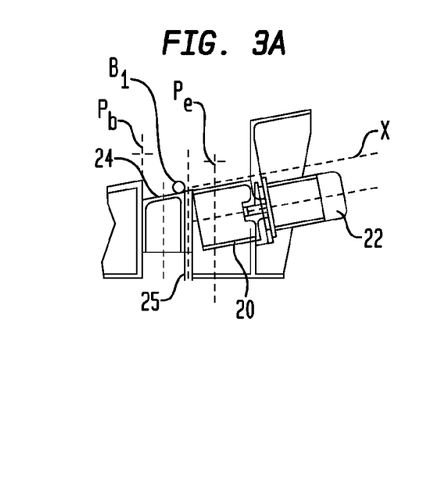
Figure 3B:
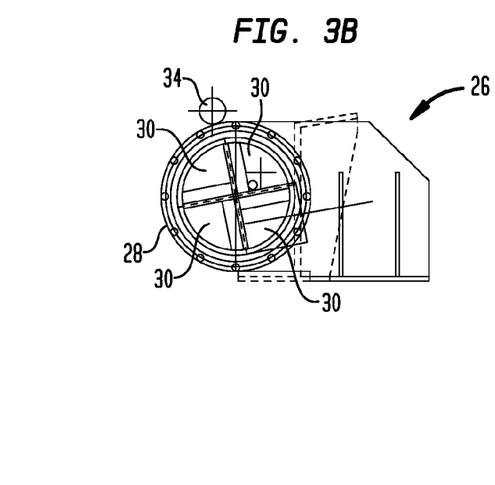

At the stage depicted in FIGS. 3, 3A, and 3B, the dividing wall 25 has been lowered beneath plane X, and a leading segment of bar $B_1$ is shown sliding laterally and downwardly from the rollers 20 across the braking surface 24 into the braking $P_b$. Simultaneously, motor 40 is energized to rotatably index the switch barrels 28 in unison about axis A, thereby moving the guide channel 30 carrying the trailing section of bar $B_1$ into alignment with the braking path $P_b$, while bringing the next adjacent guide channel into alignment with the entry path $P_e$. Motor 40 can be energized as soon as the bar tail end has entered the first upstream switch barrel.

Figure 4:
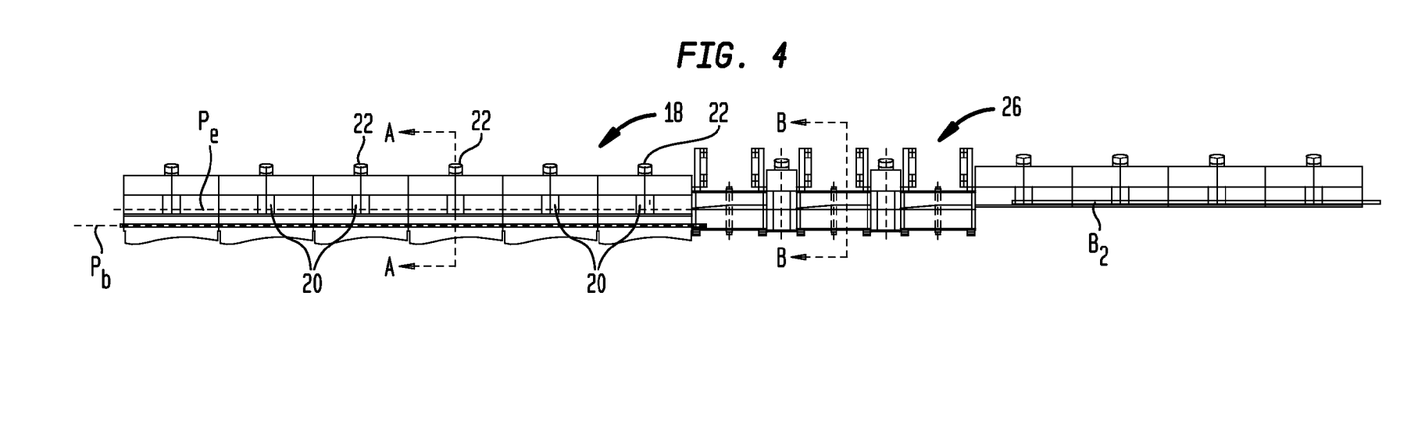
Figure 4A:
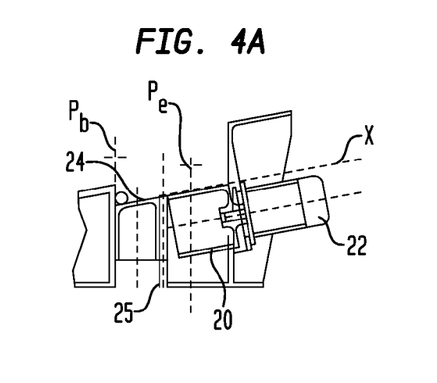
Figure 4B:
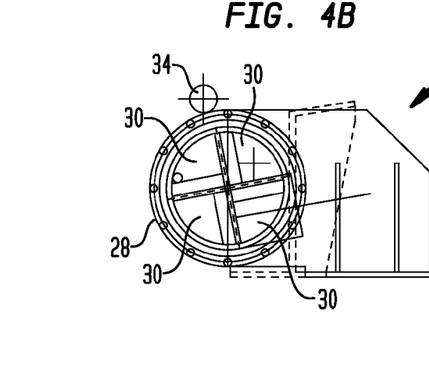

At the stage depicted in FIGS. 4, 4A, and 4B, the indexing of the switch barrels has been completed, with guide channel 30 guiding the trailing segment of bar $B_1$ now aligned with the braking path $P_b$, and with the next guide channel aligned with the entry path $P_e$. This has been achieved prior to the arrival of the leading end of bar $B_2$ at the switch mechanism 26.

Figure 5:
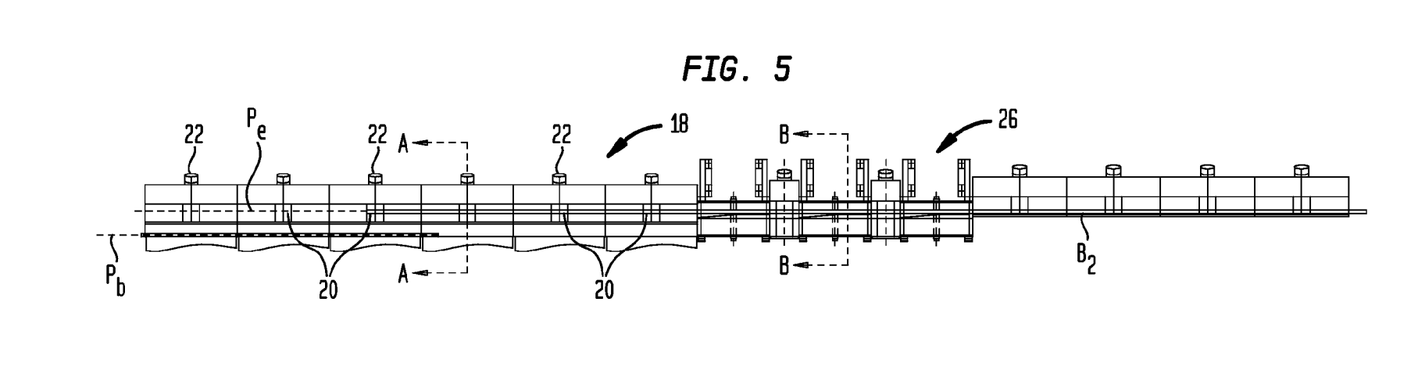
Figure 5A:
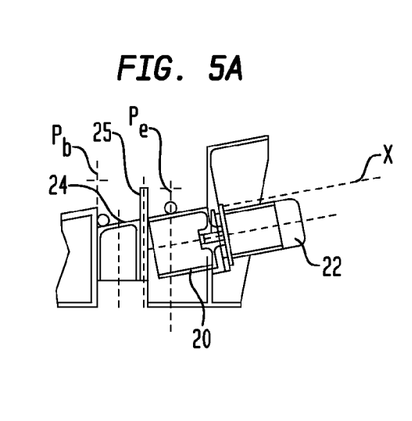
Figure 5B:
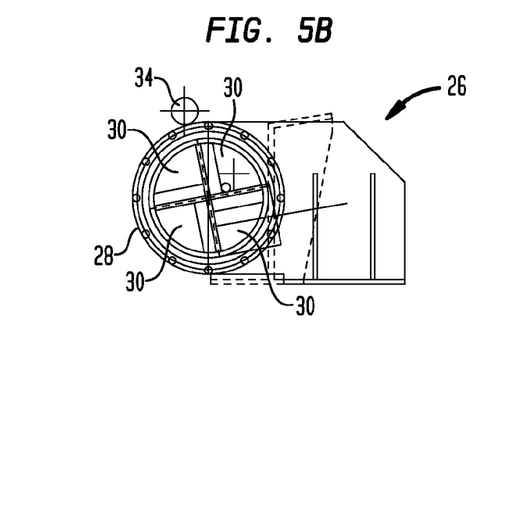

At the stage depicted in FIGS. 5, 5A, and 5B, the dividing wall 25 has been adjusted to its raised position, the bar $B_1$ is sliding to a stop along braking path $P_b$, and the next bar $B_2$ is passing through the guide channels 30 of the switch barrels onto the rollers 20 of the roller exit table 18.

The above described sequence is repeated for each successive bar being received along the entry path $P_e$.

Figure 9:
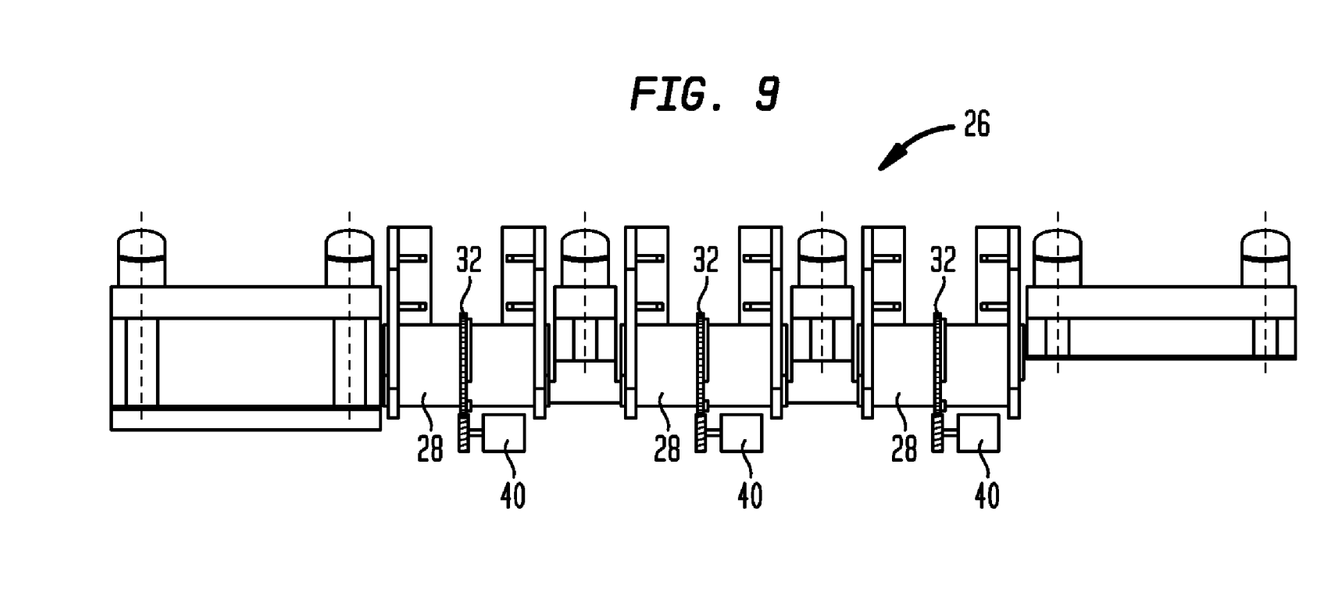
FIG. 9 is a view similar to FIG. 6 depicting an alternative embodiment of the invention.

An alternative embodiment of the present invention is depicted in FIG. 9, where the switch barrels are driven independently of each other by dedicated drives 40, thereby allowing barrel rotation to be sequentially indexed.

Figure 10:
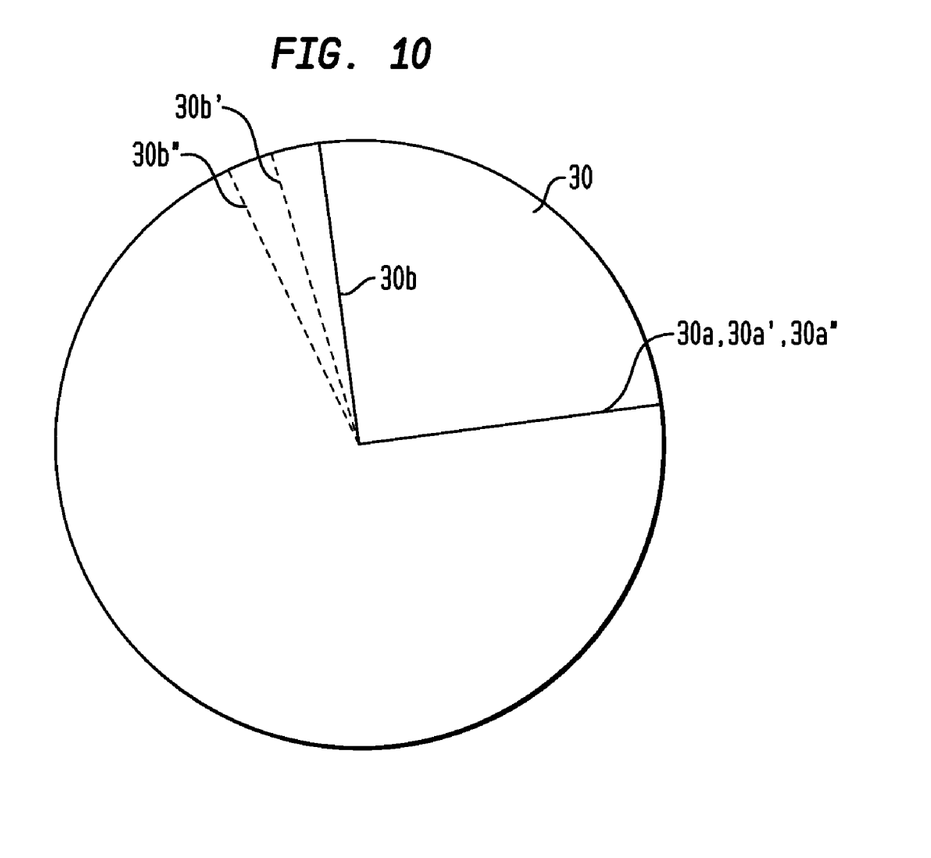
FIG. 10 is a diagrammatic view of the rotary switch looking downstream from its receiving end and depicting an alternative configuration of the walls defining the successive guide channels.

In another embodiment, as depicted in FIG. 10, the bottom walls 30a, 30a', and 30a'' of successive guide channels 30 are in alignment, and the side walls 30b, 30b', and 30b'' are progressively set back in a stepped configuration to thereby reduce frictional drag on the bars from segment to segment of the switch mechanism.

It will be seen, therefore, that with each embodiment of the present invention, the tail end segment of each bar is continuously guided in the successive channels 30 of the rotary switch barrels while being transferred laterally from the entry path $P_e$ to the braking path $P_b$. This avoids the creation of tail end kinks that have plagued prior art installations relying on paddle switches.

As the active guide channels 30 carrying the bar tail end segments are rotatably indexed into alignment with the braking path $P_b$, the next empty series of guide channels 30 is rapidly brought into alignment with the entry path $P_e$. The rapidity with which this is achieved makes it possible to reduce the length of the gap G between successive bars. This translates into a reduction in the required acceleration of the bars on the roller exit table 18, which in turn reduces the time required for the bars to slide to a stop in the braking path $P_b$.

We claim:

1. Apparatus for receiving successive bars moving longitudinally along an entry path and for laterally transferring the bars from said entry path to a braking path, said apparatus comprising:
   a run in table having a plurality of rollers arranged to convey the bars along said entry path;
   a braking surface arranged between said run in table and the braking path, said braking surface and the rollers of said run in table lying in a plane sloping downwardly from said entry path to said braking path;
   a dividing wall arranged between said run in table and said braking surface, said dividing wall being adjustable between a raised position projecting above said plane to block lateral downward movement of bars from said entry path across said braking surface to said braking path, and a lowered position accommodating such downward movement; and
   a switch positioned in advance of said dividing wall, said switch having a plurality of guide channels arranged around a common axis, said switch being positioned to successively align individual guide channels with said entry path to thereby direct bars passing there through along said entry path while said dividing wall is in its raised position, and being rotatable about said axis to successively realign said individual guide channels with said braking path to thereby direct bars passing therethrough to and along said braking path when said dividing wall is in its lowered position.

2. The apparatus of claim 1 wherein said switch comprises a plurality of axially aligned barrels, each of said barrels defining a plurality of said guide channels arranged around said common axis.

3. The apparatus of claim 2 further comprising first drive means for mechanically coupling and rotatably indexing said barrels in unison about said common axis.

4. The apparatus of claim 3 further comprising second drive means for rotatably driving said rollers.

5. The apparatus of claim 4 wherein some of said rollers are interspersed along said entry path between said barrels.

6. The apparatus of claim 3 wherein said first drive means comprises external ring gears on said barrels, said ring gears being in meshed relationship with pinions carried on a drive shaft parallel to said axis, and a drive motor coupled to said drive shaft via a gear reduction unit.

7. The apparatus of claim 2 further comprising means for rotatably driving said barrels about said common axis independently of each other to thereby allow barrel rotation to be sequentially indexed.

* * * * *